(12) United States Patent
Jeter et al.

(10) Patent No.: US 6,269,458 B1
(45) Date of Patent: Jul. 31, 2001

(54) COMPUTER SYSTEM AND METHOD FOR DIAGNOSING AND ISOLATING FAULTS

(75) Inventors: Jay D. Jeter; Ronald J. Landry, both of Allen, TX (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 08/391,541

(22) Filed: Feb. 21, 1995

(51) Int. Cl.⁷ .................................................. G06F 11/26
(52) U.S. Cl. ............................................. 714/42; 714/53
(58) Field of Search .......................... 714/67.1, 68.1, 714/42

(56) References Cited

U.S. PATENT DOCUMENTS

| | | | |
|---|---|---|---|
| 3,573,751 | 4/1971 | Delisle | 340/172.5 |
| 4,453,213 | 6/1984 | Omagosa | 364/200 |
| 4,606,024 | 8/1986 | Glass et al. | 371/16 |
| 4,918,693 | 4/1990 | Ardini, Jr. et al. | 371/21.6 |
| 4,959,772 | 9/1990 | Smith et al. | 364/200 |
| 4,970,726 | 11/1990 | Carn et al. | 371/16.5 |
| 4,979,144 | * 12/1990 | Mizuta | 364/900 |
| 5,239,637 | * 8/1993 | Davis et al. | 395/425 |
| 5,461,634 | * 10/1995 | McGrath et al. | 371/67.1 |

\* cited by examiner

*Primary Examiner*—Robert Beausoleil
*Assistant Examiner*—Scott T. Baderman
(74) *Attorney, Agent, or Firm*—Finnegan, Henderson, Farabow, Garrett & Dunner, L.L.P.

(57) ABSTRACT

A computer system for diagnosing and isolating faults in the computer system. A first value is written from the processor using the bus a first address within the address space of a diagnostic state machine. The value is latched in a first register and written from the first register to a second address in the memory. By reading a second value from the memory at second address, the processor compares the second value to the first value to indicate an error if they are different.

25 Claims, 5 Drawing Sheets

COMPUTER SYSTEM AND METHOD FOR DIAGNOSING AND ISOLATING FAULTS

BACKGROUND OF THE INVENTION

The present invention relates to a computer system and method for a computer diagnostic. More particularly, the present invention relates to a computer system and method for diagnosing and isolating faults in multiple card computer systems.

Typical computer systems use diagnostics to verify proper operation and addressing of internal memory devices. Conventional diagnostics involve well-known diagnostic techniques in which the processor writes data to and reads data from memory. In the most basic implementation, the processor simply writes a pattern of data to a particular memory location and then reads back the data from that location, verifying its value. This procedure is then repeated for different patterns and different memory locations. More complex techniques test differently. For example, one technique writes high bits to an entire memory device, writes low bits to a single location within that memory device, and reads all locations of the memory device to verify that the data write to the single location has not corrupted other memory locations. Other techniques, some including statistical analyses, are well known in the art.

The techniques also work in shared-bus computer systems in which a processor is connected to external cards or devices (e.g., direct memory access (DMA) agents, storage devices, input/output (I/O) ports, communication devices, and other types of separate processors and external cards) via an external bus. The processor writes data to a memory location on an external card via the external bus and then reads back the data from that location, verifying its value.

This technique has a shortcoming, however. If it detects a fault, the technique cannot isolate the failing component. For example, if a processor fails to access a memory location on an external card, either the processor card, the card containing the memory location, or the external bus itself may have failed. To repair the system, a technician must analyze multiple components to find the faulty device. Accordingly, diagnostics capable of fault isolation are highly desirable to facilitate repairs and card replacements, especially in complex environments with numerous external cards. Examples of such environments include conventional and cellular telephony switching systems.

SUMMARY OF THE INVENTION

Accordingly, the present invention is directed to a computer system and method for diagnosing and isolating faults that substantially obviates one or more of the problems due to limitations and disadvantages of the prior art.

It is an object of the present invention to provide a computer system and method for efficiently diagnosing and isolating faults in a multiprocessor system.

It is a further object of the present invention to provide a computer system and method for efficiently diagnosing and isolating faults in a modular computer system.

It is another object of the present invention to provide a computer system and method facilitating fast and inexpensive repairs and enhancing reliability in telephony switching systems.

It is yet another object of the present invention to provide a computer system and method facilitating self-diagnosis of an external bus interface of a processor card up to the back connector connected to the external bus.

Additional objects and advantages of the invention will be set forth in part in the description which follows, and in part will be obvious from the description, or may be learned by practice of the invention. The objects and advantages of the invention will be realized and attained by means of the elements, method steps, and combinations particularly pointed out in the appended claims.

To achieve the objects and in accordance with the purpose of the invention, as embodied and broadly described herein, the invention comprises a method for diagnosing and isolating faults in a computer system comprising a bus coupled to a processor, a register, a diagnostic state machine, and a memory. The diagnostic state machine is associated with a first address space and the memory is associated with a second address space. The method includes the steps of writing, from the processor using the bus, a first value to a first address within the first address space and latching this first value in the register using the diagnostic state machine. The method further includes the steps of writing the first value to a second address within the second address space and reading a second value from the memory, by the processor over the bus, at the second address. The second value is compared to the first value to indicate an error if they are different.

Furthermore, as embodied and broadly described herein, the invention comprises a computer system for diagnosing and isolating faults. The computer system includes a bus coupled to a processor, a register, a diagnostic state machine, and a memory. The diagnostic state machine is associated with a first address space and the memory is associated with a second address space. The second address space is related to the first address space such that locations in the first address space correspond with locations in the second address space. The system further includes means for writing a first value to a first address within the first address space and means for writing the first value to a second address within the second address space where the second address is associated with the first address in the first address space.

Both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

To isolate a fault between the computer system of the present invention and an external device connected to the computer system's back connector via a second (external) bus, the computer system simulates a DMA by the external device without actually employing the external device. To do so, the computer system latches self-generated data and address signals from the back connector. The computer system is thereby able to test the computer system all the way to the back connector, including its interface to the second bus, to determine if the fault occurred in the computer system itself or the external device.

Figure 1:
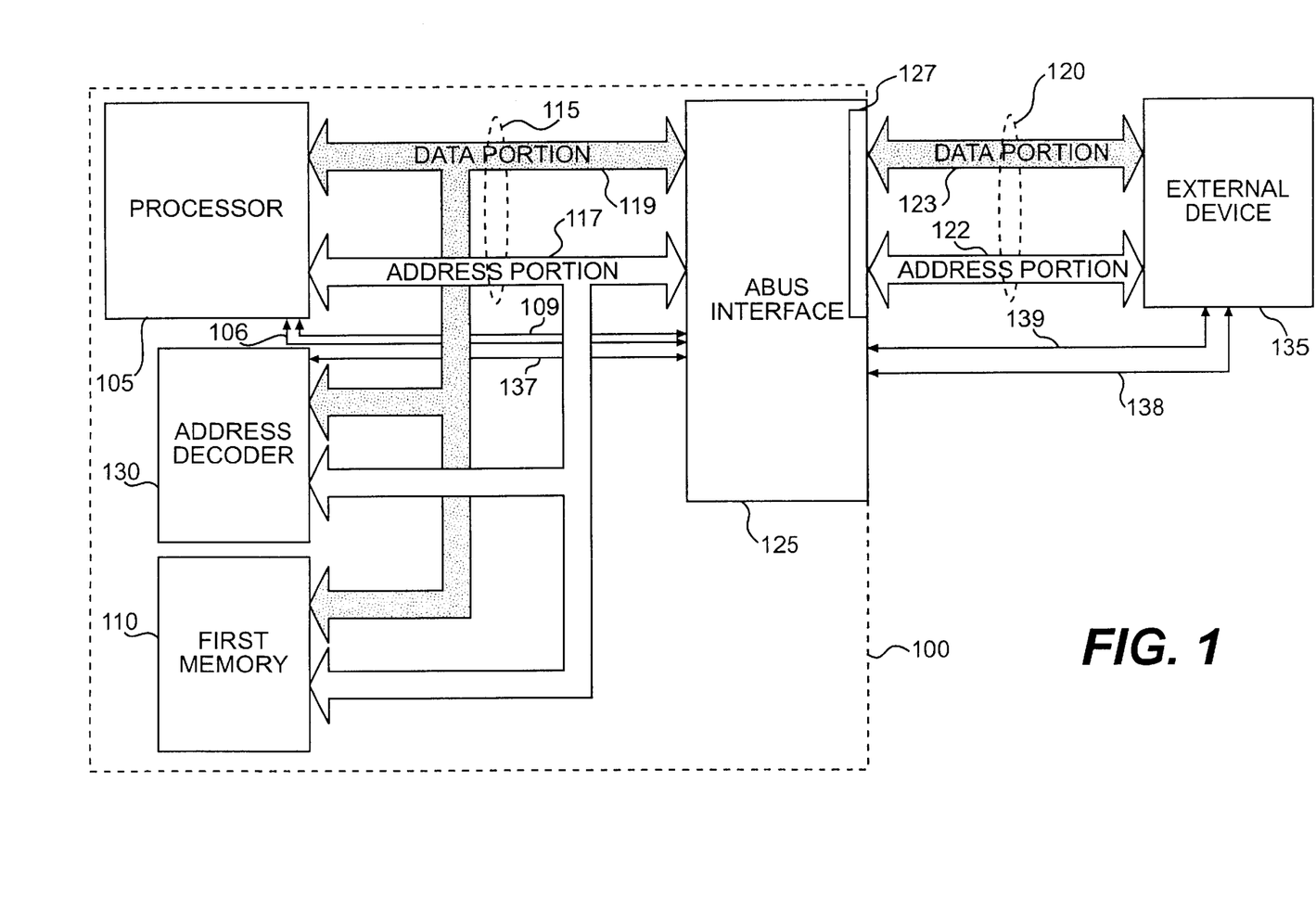
FIG. 1 is a block diagram illustrating the computer system of the present invention.

The computer system of the present invention is shown in FIG. 1 and is designated generally by reference numeral 100. The computer system 100 comprises a processor 105 and a first memory 110 connected to processor 105. Many of the details of computer system 100 are well known in art and are not specifically pertinent to the present invention. Therefore, some such details have been omitted for purposes of clarity.

As embodied herein and referring to FIG. 1, processor 105 is a commercially available microprocessor such as the MC68040 microprocessor manufactured by Motorola Inc. of Phoenix, Ariz., and is able to respond to external interrupt sources. A further description of the MC68040 microprocessor appears in the MC68040 32-Bit Microprocessor User's Manual (1989), which is incorporated herein by reference.

Computer system 100 of the present invention further includes a first bus 115 connected to processor 105. First bus 115 includes an address portion 117 and a data portion 119, and is preferably based on the Motorola 68030 bus. The Motorola 68030 bus architecture is further described in the Motorola 68030 User's Manual (2d Ed. 1989), which is incorporated herein by reference.

First bus 115 connects first memory 110 to processor 105. First memory 110 may comprise a single memory element, a combination of memory elements in different locations, or any subset thereof, depending on system requirements. In the preferred embodiment of the invention, first memory 110 comprises a 4 megabyte memory partitioned into 1024 4-kilobyte blocks. First memory 110 is associated with a second address space (not shown). Depending on specific system configurations, the second address space may consist of any range or ranges of addresses accessible by first bus 115. In the preferred embodiment, however, the second address space comprises addresses ranging from hexadecimal values 7FE00000 to 80EFFFFF.

Computer system 100 of the present invention further includes an address decoder 130 and an ABUS interface 125 coupled to first bus 115. Processor 105 is also coupled to ABUS interface 125 via connections 106 and 109. Address decoder 130 is also coupled to ABUS interface 125 via a connection 137.

As is known in the art, address decoder 130 decodes a portion of an address detected on address portion 117 of first bus 115, and uses the decoded portion to assert a chip select to control resources such as first memory 110, external devices 135 (described below), and certain state machines (described below) of the ABUS interface 125. For example, address decoder 130 uses connection 137 to control a state machine (described below) of ABUS interface 125 by asserting appropriate chip selects. In the preferred embodiment of the invention, address decoder 130 is configured to decode the upper 16 bits of an address detected on address portion 117.

In the preferred embodiment of the invention, processor 105, first memory 110, first bus 115, address decoder 130, and ABUS interface 125 are configured on a single card. ABUS interface 125 has a back connector 127 for connecting ABUS interface 125 to a second bus 120. Second bus 120 includes an address portion 122 and a data portion 123. Second bus 120 is connected to at least one external device 135.

External device 135 may be any device in the arbitration chain which can gain access to first bus 115 and communicate with processor 105 or read or write data to any portion of first memory 110. Examples include direct memory access (DMA) agents, various storage devices, input/output (I/O) ports, communication devices, and other types of separate processors and external cards. In the preferred embodiment of the invention, second bus 120 is connected to numerous external devices 135. Because the system operation is essentially the same with one or many devices, this description references a single external device 135, which is also coupled to ABUS state machine 125 via connections 138 and 139.

Second bus 120 is preferably an asynchronous bus based on the older Motorola 68000 bus to allow compatibility with certain existing external devices 135. Depending on the specific application of the present invention, however, other well known bus standards may be more appropriate. The Motorola 68000 bus architecture is further described in the Motorola 68000 User's Manual (7th Ed. 1989), which is incorporated herein by reference.

Figure 2:
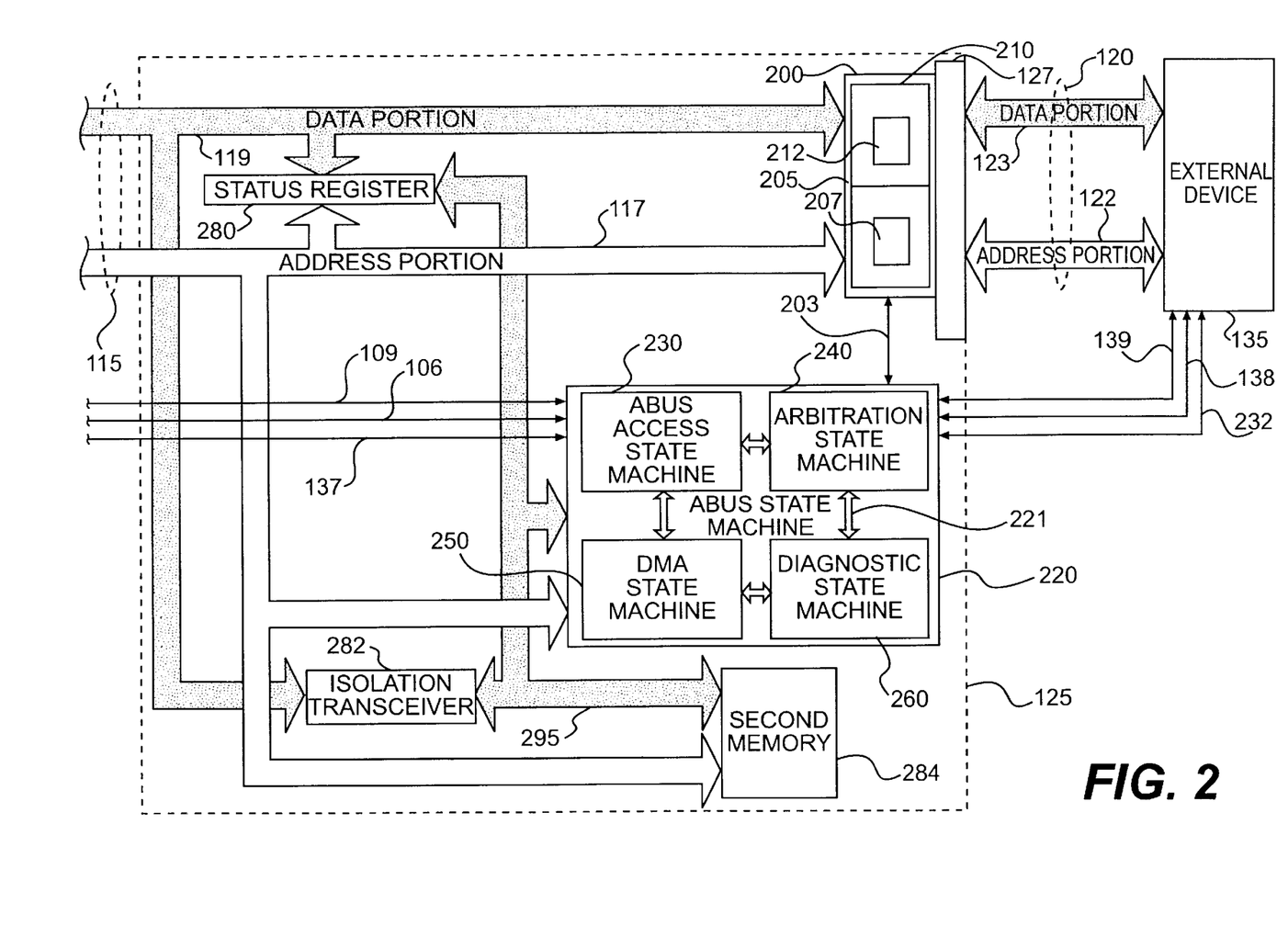
FIG. 2 is a block diagram illustrating the ABUS interface of the computer system of FIG. 1.

ABUS interface 125 provides capability for processor 105 to communicate with external devices 135 connected to second bus 120. FIG. 2 is a block diagram illustrating ABUS interface 125. As shown in FIG. 2, first bus 115 extends into and makes connections within ABUS interface 125.

ABUS interface 125 includes a transceiver circuit 200 connected to first bus 115. Transceiver circuit 200 includes an address transceiver 205 connected to address portion 117 and a data transceiver 210 connected to data portion 119. Address transceiver 205 and data transceiver 210 include registers 207 and 212, respectively. Registers 207 and 212 each preferably include tri-state D-type flip-flops (not shown). Address transceiver 205 and data transceiver 210 each preferably include control circuitry arranged for multiplexed transmission of data directly from first bus 115, second bus 120, or registers 207 and 212. For example, address transceiver 205 and data transceiver 210 comprise a plurality of octal transceivers such as 74F646 transceivers, as are known in the art and commercially available from the National Semiconductor Company. Data transceiver 210 preferably comprises four 74F646 transceivers. Likewise, address transceiver 205 preferably comprises three 74F646 transceivers.

Address transceiver 205 and data transceiver 210 are connected to address portion 122 and data portion 123 of second bus 120, respectively, via back connector 127. Transceiver circuit 200 isolates first bus 115 and second bus 120 so that processor 105 can respond to interrupts during a DMA cycle by external device 135.

ABUS interface 125 further comprises an ABUS state machine 220 connected to first bus 115. ABUS State machine 220 comprises four state machines, an ABUS access state machine 230, an arbitration state machine 240, a DMA state machine 250, and a diagnostic state machine 260. ABUS access state machine 230, arbitration state machine 240, DMA state machine 250, and diagnostic state machine 260 are comprised of standard logic and memory elements and are interconnected via internal connections 221. ABUS state machine 220 is also connected to transceiver circuit 200 via connection 203 for controlling transceiver circuit 200.

ABUS access state machine 230 controls read/write cycles from processor 105 to external devices 135 via the second bus 120, providing interface operations to comply with the architecture of second bus 120 as set forth above. To access an external device 135, processor 105 reads or writes to an address within the ABUS address space which preferably consists of addresses having hexadecimal values from 00100000H to 002FFFFH. Address decoder 130 decodes the upper sixteen bits of the address, using the decoded portion to assert an ABUS access chip select via connection 137. ABUS access state machine 230 starts when it receives the ABUS chip select from address decoder 130 via connection 137. Thus, in its normal state, ABUS access state machine 230 waits for the ABUS chip select.

In response to an ABUS chip select via connection 137, ABUS access state machine asserts strobes to external device 135 via connection 232 and waits for a data transfer acknowledge from external device 135 via connection 138. When the data transfer acknowledge is received, ABUS access state machine 230 asserts a data transfer acknowledge to processor 105 via connection 109, allowing processor 105 to complete its read/write cycle. When processor 105 completes its cycle, it negates its ABUS chip select via connection 137 and, in response, ABUS access state machine 230 returns to its normal state described above.

Arbitration state machine 240 performs arbitration for first bus 115 when external devices 135 or diagnostic state machine 260 seeks ownership of first bus 115 by controlling arbitration signals for processor 105 and external device 135 via connections 106 and 139, respectively. In the normal state of arbitration state machine 240, processor 105 has control of first bus 115. When arbitration state machine 135 detects a bus request from an external device 135 via connection 139, or from diagnostic state machine 260 via an internal connection 221, arbitration state machine 240 arbitrates for first bus 115 via connection 106. If arbitration state machine 240 wins the arbitration, processor 105 grants state machine 240 control of first bus 115 by asserting a bus grant signal via connection 106.

Arbitration state machine 240 then completes the arbitration by asserting a bus grant signal to external device 135 via connection 139 or to diagnostic state machine 260 via an internal connection 221, detecting a bus grant acknowledge from external device 135 via connection 139 or from diagnostic state machine 260 via an internal connection 221, and detecting negation of the bus grant acknowledge. Arbitration state machine 240 then returns to its normal state described above.

Alternatively, if DMA state machine 250 asserts a stall condition, arbitration state machine 240 releases first bus 115 and holds second bus 120 until the stall condition is cleared. When this occurs, arbitration state machine 240 re-arbitrates for first bus 115 and completes the arbitration cycle as described in the previous paragraph.

DMA state machine 250 controls read and write cycles to first memory 110 from external devices 135. Furthermore, in conjunction with processor 105 and by using status register 280, isolation transceiver 282, second memory 284, and data bus 295, DMA state machine 250 controls the mode of operation of a data cache (not shown) associated with processor 105 to ensure data integrity. DMA state machine 250, as well as status register 280, isolation transceiver 282, second memory 284, and data bus 295, are further described in U.S. patent application of Jay D. Jeter, Ronald J. Landry, Patrick S. Milligan, and Gerry R. Dubois, entitled "Computer System and Method for Controlling the Mode of Operation of a Data Cache," filed on the same date herewith, and which is incorporated herein by reference.

Diagnostic state machine 260 coordinates the activity of ABUS access state machine 230, arbitration state machine 240, and DMA state machine 250 when a diagnostic cycle is run. Diagnostic state machine 260 is associated with a first address space (not shown). When processor 105 writes to a first address in the first address space, address decoder 130 decodes the upper sixteen bits of the first address, using the decoded portion to assert a diagnostic ABUS chip select via connection 137.

Depending on specific system configurations, the first address space can comprise any range or ranges of addresses accessible by first bus 115. For proper operation of address decoder 130, however, the first address space should not overlap the second address space. In the preferred embodiment of the present invention, the first address space consists of addresses having hexadecimal values from D0000000 to D003FFFF.

The second address space associated with first memory 110 is related to the first address space such that locations in the first address space correspond to locations in the second address space. This means that at least some addresses within the first address space map to addresses within the second address space with one-to-one correspondence. In the preferred embodiment of the present invention, each first address in the first address space corresponds to an address in the second address space equal to the lower three bytes of the first address plus a constant. In the preferred embodiment, the constant is hexadecimal value 7F000000.

Figure 3:
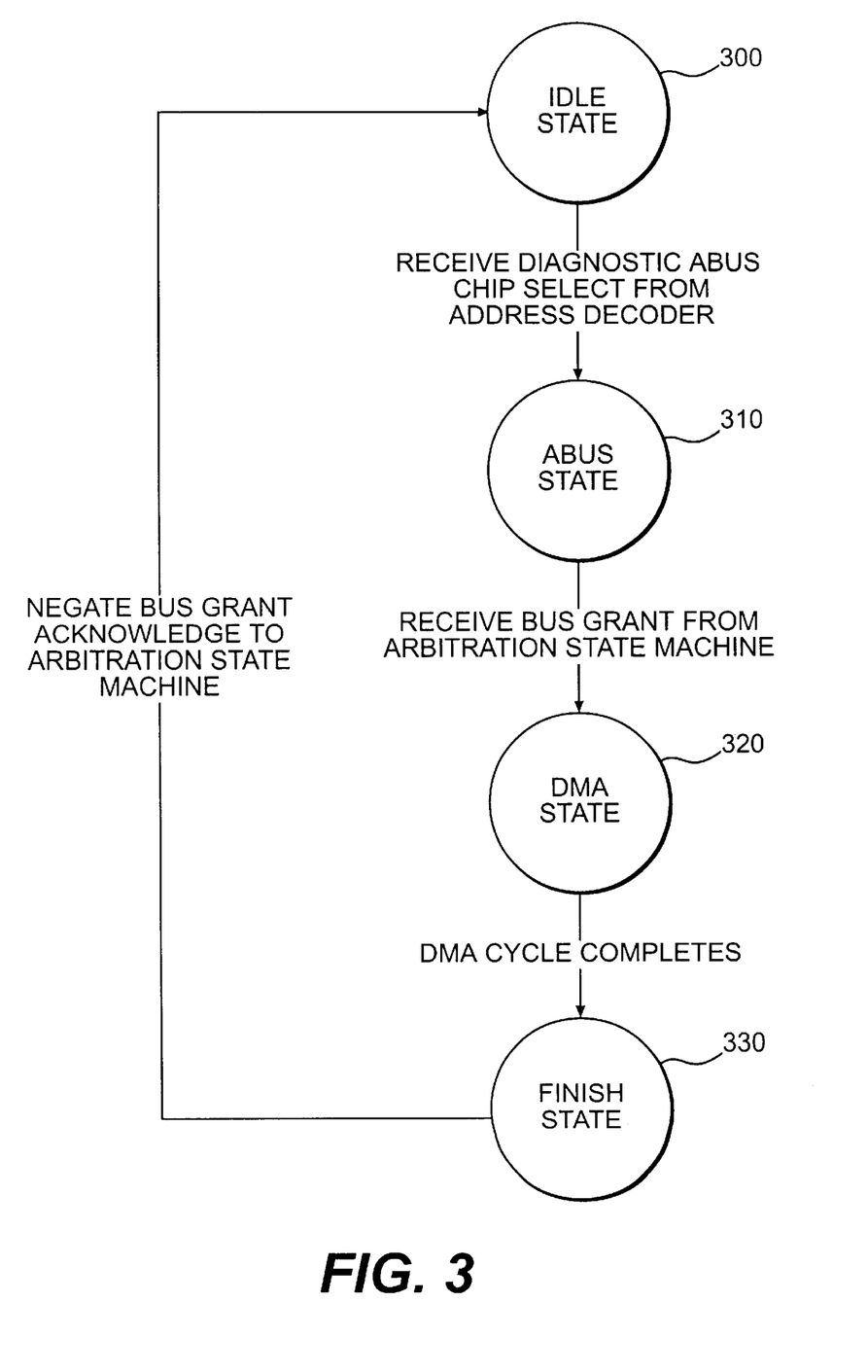
FIG. 3 is a state diagram illustrating states for the diagnostic state machine of the ABUS interface of FIG. 2.

FIG. 3 is a state diagram illustrating states for diagnostic state machine 260. Diagnostic state machine 260 is normally in an idle state 300. In idle state 300, diagnostic state machine 260 waits for processor 105 to write a first value to a first address within the first address space. Upon receiving a diagnostic ABUS chip select from address decoder 130 via connection 137, diagnostic state machine 260 moves from idle state 300 to an ABUS state 310. In ABUS state 310, diagnostic state machine 260 starts ABUS access state machine 230. The ABUS access state machine 230, latches the lower three bytes of the first address and the first value into registers 207 and 212 of transceiver circuit 200, respectively. Diagnostic state machine 260 then requests first bus 115, starting arbitration state machine 240.

Upon receiving a bus grant signal from arbitration state machine 240, diagnostic state machine 260 negates the diagnostic ABUS chip select via connection 137 and moves to a DMA state 320. In DMA state 320, diagnostic state machine 260 starts DMA state machine 250, completing arbitration by asserting bus grant acknowledge to arbitration state machine 240. After the DMA cycle completes, diagnostic state machine 260 moves to a finish state 330. In finish state 330, diagnostic state machine 260 releases first bus 115 by negating the bus grant acknowledge to arbitration state machine 240. Diagnostic state machine 260 then returns to idle state 300.

Figure 4:
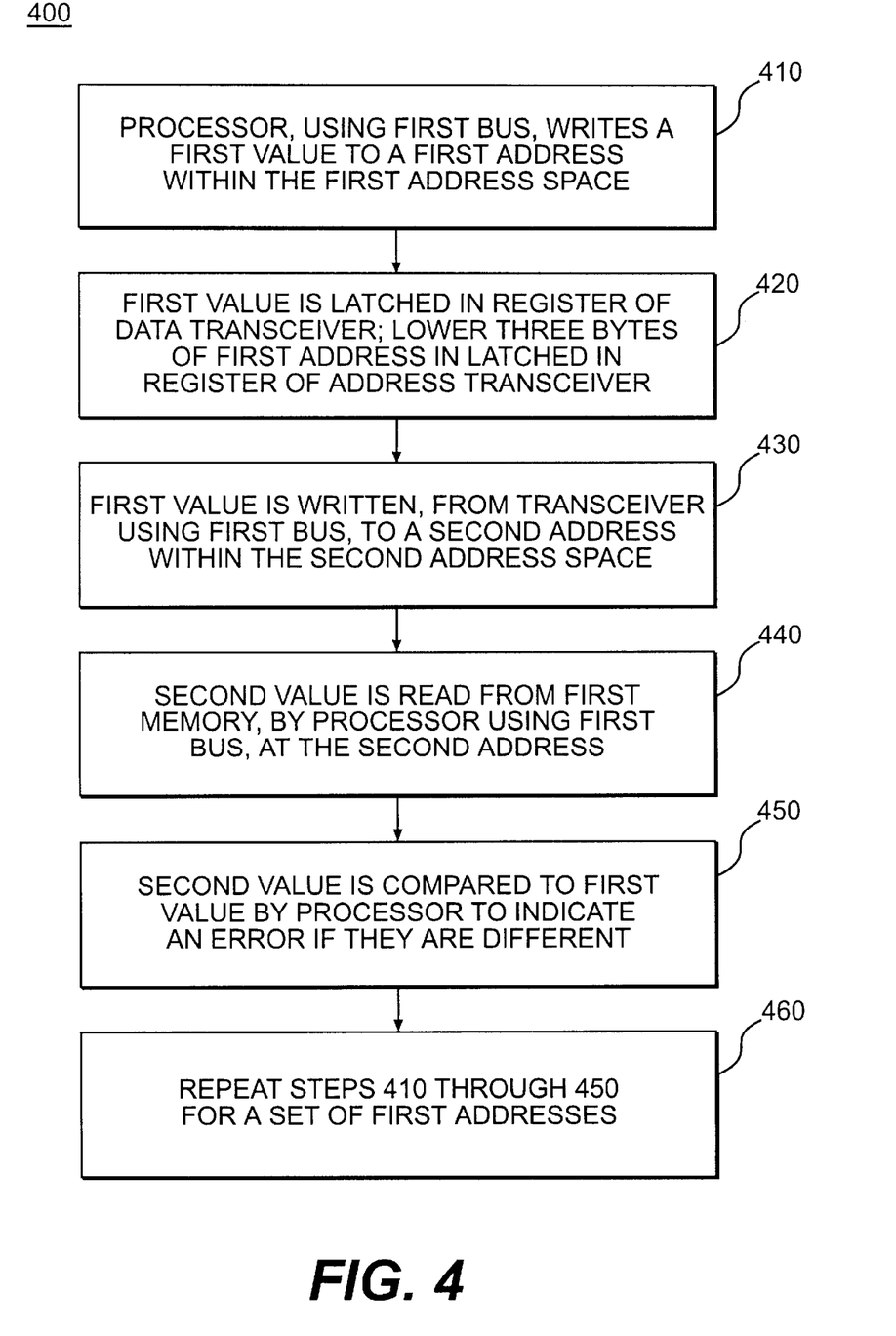
FIG. 4 is a flowchart illustrating the preferred method of the present invention.

The preferred method of the present invention is illustrated by flow diagram 400 in FIG. 4. Referring to FIG. 4, processor 105, using first bus 115, writes a first value to a first address within the first address space associated with the diagnostic state machine 260. (Step 410). The first value is latched in register 212 of data transceiver 210 by diagnostic state machine 260. The lower three bytes of the first address is latched in register 207 of address transceiver 205 by diagnostic state machine 260. (Step 420).

The first value is written, from transceiver circuit 200 using first bus 115, to a second address within the second address space. (Step 430). The second address is equal to the lower three bytes of the first address latched in register 207 plus the hexadecimal value 7F000000. A second value is then read from first memory 110, by processor 105 over first bus 115, at the second address. (Step 440). The second value is compared to first value to indicate an error if they are different. (Step 450).

Steps 410 through 450 are then repeated for a set of first addresses constituting a subset of the first address space. (Step 460). For example, Steps 400 through 450 may be repeated for each first address associated with the first address space.

In implement the foregoing, it is important to note that the system and method are unable to distinguish between faults occurring in external cards and those occur in the external data bus. It is assumed, however, that passive backplanes are highly reliable.

Figure 5:
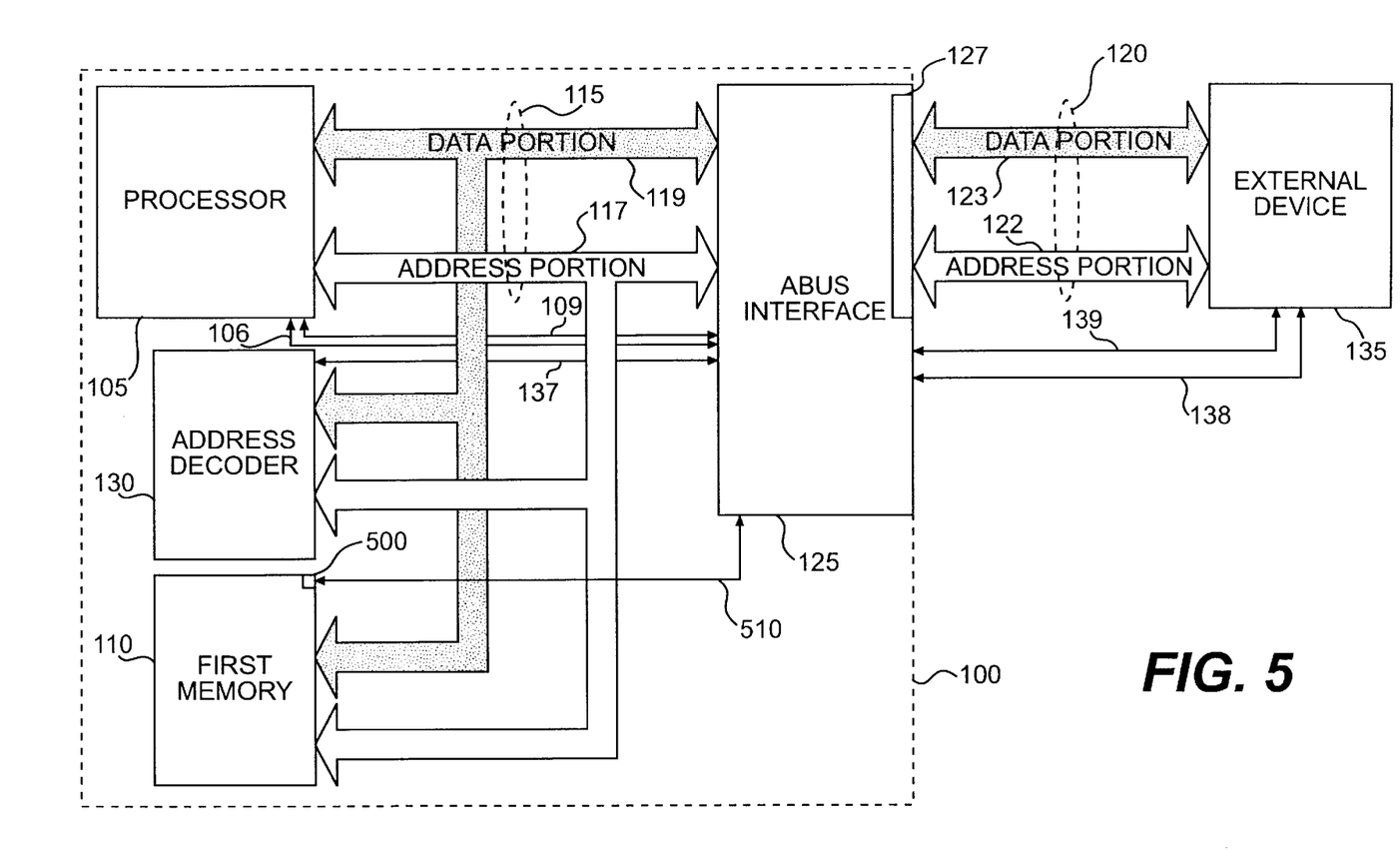
FIG. 5 is a block diagram illustrating a second embodiment of the computer system of the present invention.

It will be apparent to those skilled in the art that various modifications and variations can be made in the computer system and method of the present invention without departing from the scope or spirit of the invention. For example, in step 420 of method 400, the first value may be written from transceiver circuit 200 using an auxiliary port 500 of first memory 110 via connection 510 for transfer of data without using the bus, to a second address within the second address space. Auxiliary port 500 and connection 510 are illustrated in FIG. 5. Moreover, other embodiments of the invention will be apparent to those skilled in the art from consideration of the specification and practice of the disclosed invention herein. The specification and examples are thus only exemplary, with the true scope and spirit of the invention being indicated by the following claims.

What is claimed is:

1. In a computer system comprising a bus, a processor coupled to the bus, a transceiver, containing a first register and a second register, coupled to the bus, a diagnostic state machine coupled to the bus and associated with a first address space defined by addresses on the bus, and a memory coupled to the bus and associated with a second address space defined by addresses on the bus, the second address space being related to the first address space such that locations in the first address space correspond with locations in the second address space, a method for diagnosing and isolating faults in the computer system comprising the steps of:

writing, from the processor onto the bus, a first value to a first address within the first address space;

latching the first value in the first register using the diagnostic state machine;

writing the first value from the first register to a second address within the second address space, the second address being associated with the first address in the first address space;

reading, by the processor, a second value from the memory over the bus, at the second address; and comparing, by the processor, the second value to the first value to indicate an error if they are different.

2. The method of claim 1, wherein the step of latching the first value in the first register includes the substep of:

latching the first value in a transceiver coupled to the bus.

3. The method of claim 2 further comprising the step of latching a portion of the first address in the second register.

4. The method of claim 3, wherein the step of latching a portion of the first address in the second register includes the substep of:

latching a lower portion of the first address in the second register.

5. The method of claim 4, wherein the step of writing the first value to a second address within the second address space includes the substep of:

writing the first value to an address equaling the lower portion of the first address latched in the second register.

6. The method of claim 4, wherein the step of writing the first value to a second address within the second address space includes the substep of:

writing the first value to an address equaling the lower portion of the first address latched in the second register plus a constant.

7. The method of claim 3, wherein the step of writing the first value to a second address within the second address space includes the substep of:

writing the first value to an address equaling the lower three bytes of the first address latched in the second register plus a constant.

8. The method of claim 1, wherein the step of writing the first value to a second address includes the substep of:

writing the first value to the second address using an auxiliary port of the memory for transfer of data without using the bus.

9. The method of claim 8, wherein the step of latching the first value in the first register includes the substep of:

latching the first value in a transceiver coupled to the bus.

10. The method of claim 9 further comprising the step of latching a portion of the first address in the second register.

11. The method of claim 10, wherein the step of latching a portion of the first address in the second register includes the substep of:

latching a lower portion of the first address in the second register.

12. The method of claim 11, wherein the step of writing the first value to a second address within the second address space includes the substep of:

writing the first value to an address equaling the lower portion of the first address latched in the second register.

13. The method of claim 11, wherein the step of writing the first value to a second address within the second address space includes the substep of:

writing the first value to an address equaling the lower portion of the first address latched in the second register plus a constant.

14. The method of claim 10, wherein the step of writing the first value to a second address within the second address space includes the substep of:

writing the first value to an address equaling the lower three bytes of the first address latched in the second register plus a constant.

15. In a computer system comprising a bus, a processor coupled to the bus, a transceiver coupled to the bus, a diagnostic state machine coupled to the bus and associated with a first address space defined by addresses on the bus, and a memory coupled to the bus and associated with a second address space defined by addresses on the bus, the second address space being related to the first address space such that locations in the first address space correspond with locations in the second address space, a method for diagnosing and isolating faults in the computer system comprising the steps of:

writing, from the processor onto the bus, a first value to a first address within the first address space;

latching the first value in the transceiver using the diagnostic state machine;

latching the lower three bytes of the first address in the transceiver using the diagnostic state machine;

writing, from the transceiver onto the bus, the first value to a second address within the second address space, the second address being equal to the lower three bytes of the first address latched in the transceiver plus a constant;

reading, by the processor, a second value from the memory over the bus, at the second address; and     comparing, by the processor, the second value to the first value to indicate an error if they are different.

16. The method of claim 15, further comprising the step of repeating the method for each first address associated with the first address space.

17. A computer system for diagnosing and isolating faults comprising:

a bus;

a processor coupled to the bus;

a transceiver, containing a first register and a second register, coupled to the bus;

a diagnostic state machine coupled to the bus and addressable by addresses within a first address space;

a memory coupled to the bus and addressable by addresses within a second address space related to the first address space such that locations in the first address space correspond with locations in the second address space;

means, associated with the processor, for writing a first value to a first address within the first address space;

means, associated with the first register, for writing the first value to a second address within the second address space, the second address being associated with the first address in the first address space; and     means, associated with the processor, for comparing the second value to the first value to indicate an error if they are different.

18. The system of claim 17, wherein the means for writing the first value to a second address within the second address space comprises the bus.

19. The system of claim 17, wherein:

the means for writing the first value to a second address within the second address space comprises an auxiliary port of the memory for transfer of data to the memory without using the bus.

20. The system of claim 18 further comprising:

a transceiver coupled to the bus, the transceiver including the first and second registers.

21. The system of claim 20 wherein:

the second address equals a lower portion of the first address.

22. The system of claim 21 wherein:

the second address equals the lower three bytes of the first address.

23. The system of claim 20 wherein:

the second address equals a lower portion of the first address plus a constant.

24. The system of claim 23 wherein:

the second address equals the lower three bytes of the first address plus a constant.

25. A computer system for diagnosing and isolating faults comprising:

a bus;

a processor coupled to the bus;

a transceiver coupled to the bus;

a diagnostic state machine coupled to the bus and addressable by addresses within a first address space;

a memory coupled to the bus and addressable by addresses within a second address space related to the first address space such that locations in the first address space correspond with locations in the second address space;

means, associated with the processor, for writing a first value to a first address within the first address space;

means, associated with the transceiver, for writing the first value to a second address within the second address space, the second address being equal to the lower three bytes of the first address plus a constant; and     means, associated with the processor, for comparing the second value to the first value to indicate an error if they are different.

\* \* \* \* \*